United States Patent [19]
Khais et al.

[11] Patent Number: 5,634,599
[45] Date of Patent: *Jun. 3, 1997

[54] TIRE RECYCLING PROCESS

[75] Inventors: Iosif Khais, Brooklyn; Angelo Reali, Manhasset Hills; Michael Reali, Old Brookville; Igor Reznik, Brooklyn, all of N.Y.

[73] Assignee: Crumbrubber Technology Co., Inc., Jamaica, N.Y.

[*] Notice: The term of this patent shall not extend beyond the expiration date of Pat. No. 5,568,731.

[21] Appl. No.: 519,129

[22] Filed: Aug. 24, 1995

Related U.S. Application Data

[63] Continuation-in-part of Ser. No. 197,137, Feb. 17, 1994, Pat. No. 5,568,731.

[51] Int. Cl.$^6$ .................................................. B02C 19/12
[52] U.S. Cl. ..................... 241/23; 241/24.14; 241/24.17; 241/DIG. 31; 241/DIG. 37
[58] Field of Search ................ 241/23, 65, DIG. 37, 241/DIG. 31, 24.14, 24.17, 24.25, 24.27, 24.13, 24.15

[56] References Cited

U.S. PATENT DOCUMENTS

| | | | |
|---|---|---|---|
| 3,718,284 | 2/1973 | Richardson | 241/65 X |
| 4,025,990 | 5/1977 | Lovette | 241/DIG. 37 X |
| 4,273,294 | 6/1981 | Hollely et al. | 241/23 X |

*Primary Examiner*—Mark Rosenbaum
*Attorney, Agent, or Firm*—Collard & Roe, P.C.

[57] ABSTRACT

The invention relates to process for recycling tires and other recyclable materials. The process includes a series of steps designed to reduce a rubber or polymer tire into pulverized material. The process involves first shredding the tires or recyclable material into chips. The chips are then cooled to cryogenic temperatures at which said pieces become brittle. The brittle pieces are then pulverized in the second step. Pulverized material is then screened, removing large chunks of rubber or polymer from the mixture. Finally, the remaining fiber and magnetic material is separated out of the pulverized material, through the use of a magnetic separator and a vibrational (fiber) separator.

4 Claims, 12 Drawing Sheets

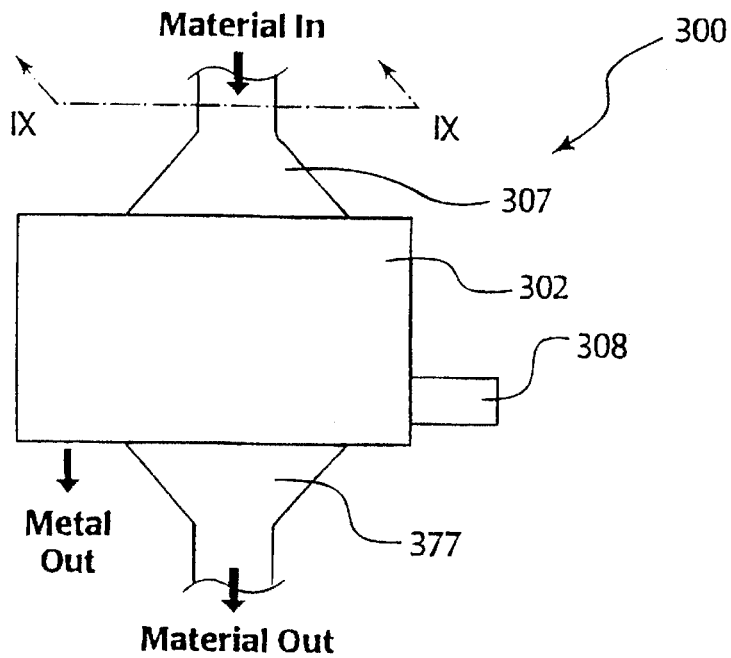
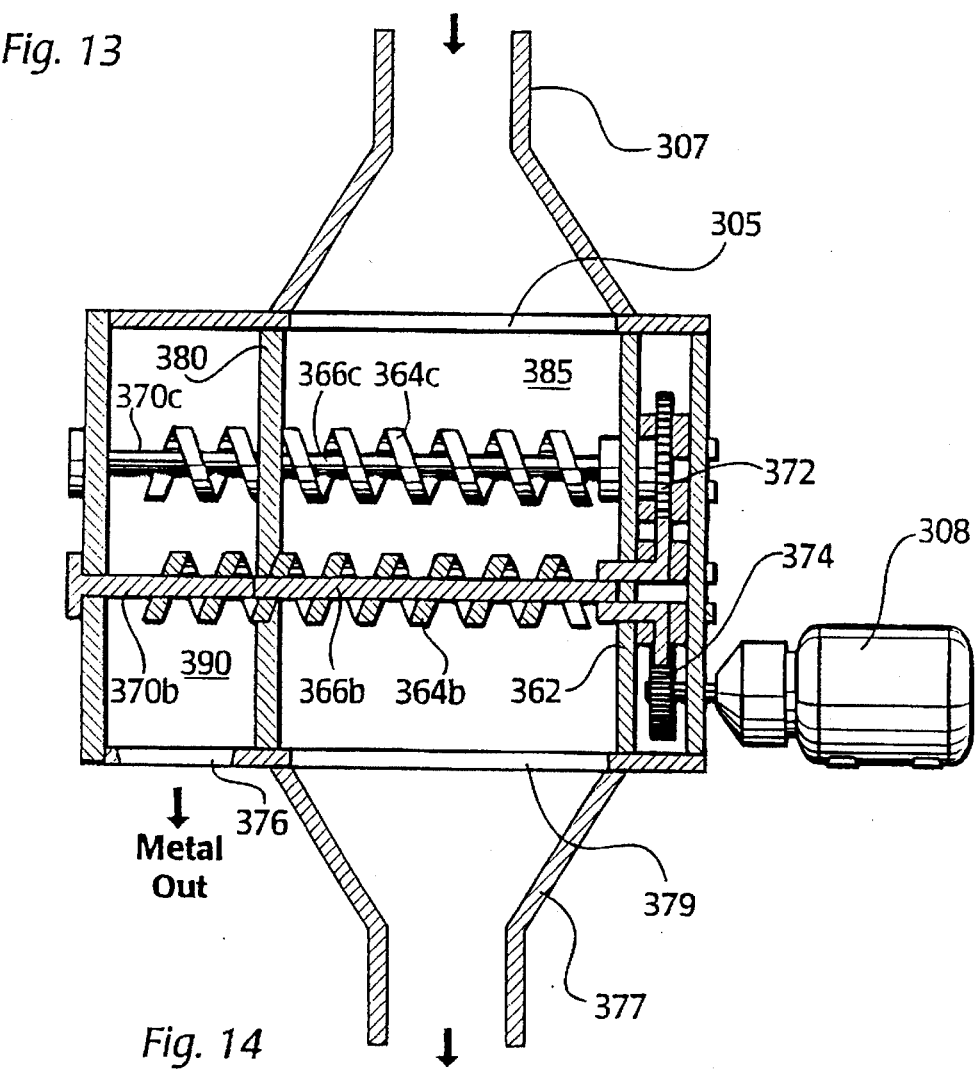

TIRE RECYCLING PROCESS

This application is a Continuation-in-Part of U.S. patent application Ser. No. 08/197,137, filed on Feb. 17, 1994 now U.S. Pat. No. 5,568,731.

BACKGROUND OF THE INVENTION

1. Field of the Invention

The invention relates to a process for recycling bulk rubber and polymeric materials. More particularly, it relates to a tire recycling process.

When polymers, and rubber material are disposed as garbage, there is a great waste in material that can be recycled. In order to convert this waste material into valuable products, it must be reduced in size and then recycled. This invention relates to an environmentally safe process for reducing this waste product to a usable material to facilitate the future recycling.

2. The Prior Art

The patent to Enikopolov et al, U.S. Pat. No. 4,607,796, discloses a method of making powder from rubber and vulcanization products. This inventive process includes compression to allow for greater pulverization. The material is then cooled to a temperature in a range of 15° C. to 60° C. under pressure and shear conditions. In addition, the pulverization process can be done in the presence of a polyethylene additive to improve the degree of comminution.

The patent to Rouse et al., U.S. Pat. No. 5,238,194, discloses a method of producing fine elastomeric or rubber particles. This process involves the following steps: First, establishing an excessive flow of water through an open set of non-rotating grinding stones. Second, the stones are rotated at full speed until a desired pressure of closure is achieved. Then the grinding mill is fed with a slurry of carrier liquid and the material is then ground while closing the water flow used to establish the flow rate. The energy expended in rotating the grinding stones is dissipated into the slurry as heat.

The patent to Rutherford Sr., U.S. Pat. No. 5,115,983, discloses a process for recycling vehicle tires. The process consists of shredding the rubber from a tire while separating the shredded rubber from the cording and beading material of the tire. This process is performed by placing the tire in a chamber and subjecting the tire to high pressure water jets. Water fired from the water jets hits the tire at a pressure of at least 2000 psi not to exceed 10,000 psi. By exposing the tire to the pressurized water streams for a predetermined period of time, the rubber is shredded from the tire and the cording and beading are also separated therefrom.

U.S. Pat. No. 4,726,530 to Miller et al., discloses a method of resource recovery from used tires. This process involves shredding tires into small pieces, screening the shredded pieces, re-shredding and re-screening the pieces. Then, the pieces of tires are granulated to the desired size. Finally, the material is separated through the use of an air separator and a magnetic separator.

The patent to Morris, U.S. Pat. No. 5,024,386 discloses a tire converting apparatus and method. This method starts by debeading the tire, and cutting the tire into two segments. The sidewalls of the cut segment are spread apart and then the segment is held flat, finally the flat segment is fed into a shredder and the shredded pieces are then recovered for further use.

The Patent to Brubaker et al, U.S. Pat. No. 4,625,922 discloses an elevated temperature comminution of vulcanized rubber and other elastomers. The invention consists of reducing the viscosity of the slurry before it is fed into the commuting zone. This involves heating the pellets into a slurry at 130° F. by either vibration or hot water.

There are disadvantages to the prior art. The process of grinding the tires has not proved sufficient. In order to reduce the tires or other recyclable materials to a fine powder, the rubber material must be reduced to a brittle state. The prior art uses either inadequate temperatures for milling, or costly cooling methods that utilize liquid nitrogen or other cryogenic chemicals in order to achieve the required cryogenic temperatures.

SUMMARY OF THE INVENTION

It is therefore an object of the invention to provide a process which recycles rubber and polymeric materials, such as tires, by converting them into a fine powder efficiently, effectively, and reliably.

It is another object of the invention to provide a low cost process for recycling tires and other polymeric materials.

Still another object of the invention is to provide a tire recycling process which utilizes few steps and is undertaken with convenience and facility.

Yet another object of the present invention is to provide a tire and polymeric material recycling process which includes a step for cooling the recyclable material into a brittle state ready for pulverization.

These and other related objects are achieved according to the invention by a process for recycling tires and other polymeric material including the steps of shredding the tires or polymeric material into small pieces, feeding the recyclable material into a cooling chamber, cooling the chamber to a cryogenic state and then feeding the frozen, brittle material into a hammer mill where it is pulverized. After the material is pulverized, it is then sequentially fed into a fiber and magnetic separator, whereby the fiber material and steel particles are removed from the pulverized tire or polymeric material. Upon separation, a fine rubber or polymeric powder is produced that can be used in various other products. The fiber and steel by products may also be used in other products as well.

The material is cooled in the cooling chamber by an ambient air freezing/refrigeration unit to embrittlement, usually below −90° C. according to material properties. The shredding of the polymeric material increases the overall surface area resulting in faster cooling of the recyclable material in the cooling chamber.

BRIEF DESCRIPTION OF THE DRAWINGS

Other objects and features of the present invention will become apparent from the following detailed description considered in connection with the accompanying drawings which discloses an embodiment of the present invention. It should be understood however, that the drawings are designed for the purpose of illustration only and not as a definition of the limits of the invention. In the drawings.

FIG. 13 is an elevational view of a third embodiment of the magnetic separator according to the invention;

FIG. 14 is a cross-sectional view of the magnetic separator of FIG. 13 taken along line IX—IX;

DETAILED DESCRIPTION OF THE INVENTION

Figure 1:
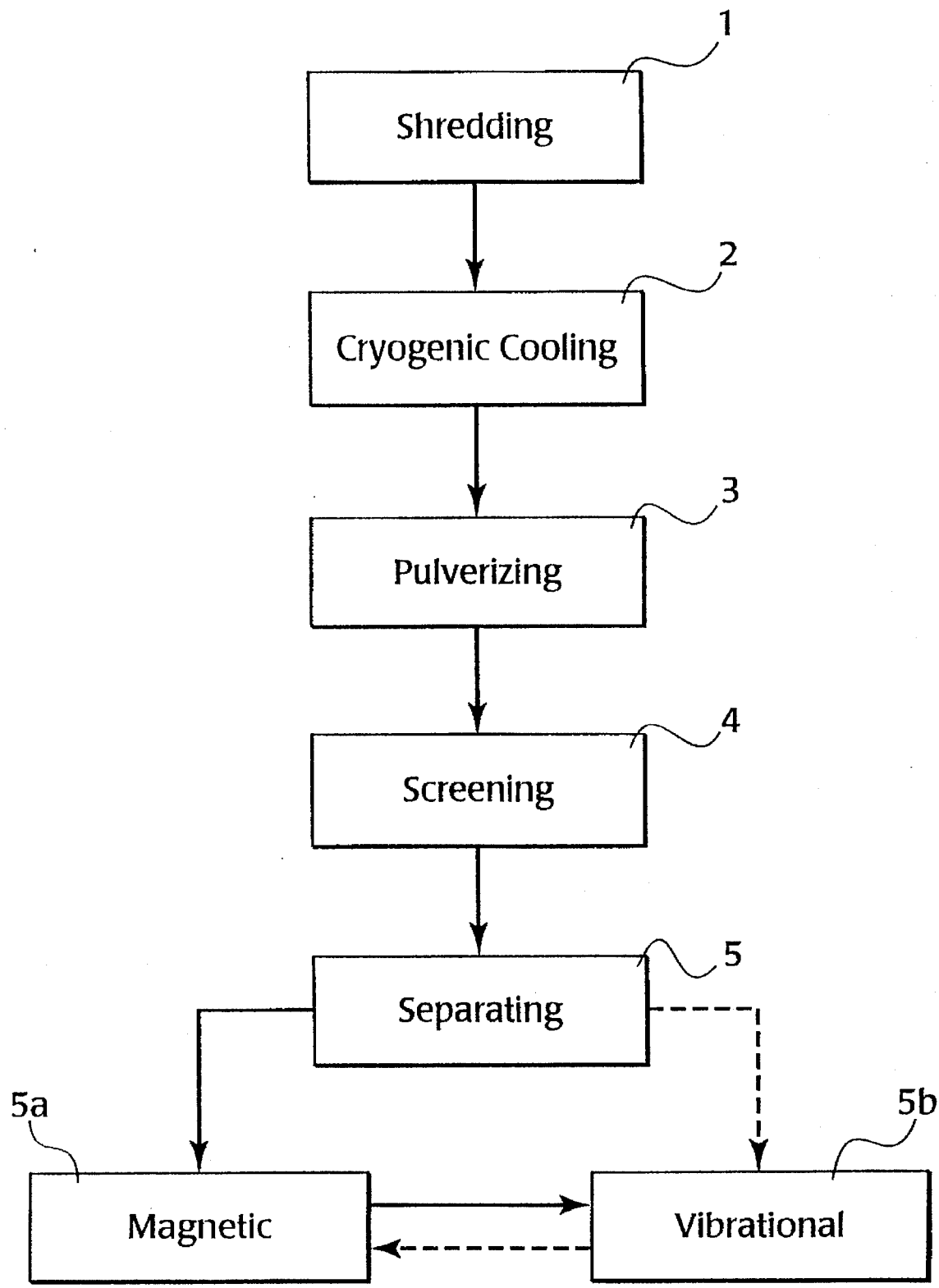
FIG. 1 is a flow chart of the process according to the invention.

The recycling process of the invention is shown by the flow chart of FIG. 1, and is for recycling tires and other polymeric materials. In the first step 1 of the process the tire or polymeric material is shredded or broken into pieces, preferably into chips of approximately 2"×2" in size. This increases the surface area for exposure to the cool air, thereby lowering the amount of time needed to cool the material to the desired temperature. The pieces are then fed into cooling chamber 12 (FIG. 2) and cooled in the second step 2 to cryogenic temperatures, causing said pieces to become brittle. When the pieces are in cooling chamber 12 (FIG. 2), they move counter current with the flow of cooling air, causing the chips to cool faster as they progress through the chamber. A suitable temperature for the cryogenic freezing of the material is in the range between −130° C. to −90° C. Once the material has been cryogenically frozen, the material is fed into a hammer mill where it is pulverized 3. The resulting material from the hammer mill is a mixture of rubber powder, fiber and steel remains. This mixture is then screened to remove the larger, non-pulverized material. After the material mixture leaves screening step 4, it is fed into a magnetic separator where the steel particles are removed, and then it is fed into a vibrational separator to remove the fiber particles with the output resulting in a fine powder for use in other suitable applications. The steps of magentic separation 5a and vibrational (fiber) separation 5b can be performed in in any order with respect to each other, as indicated by the dotted lines.

Figure 2:
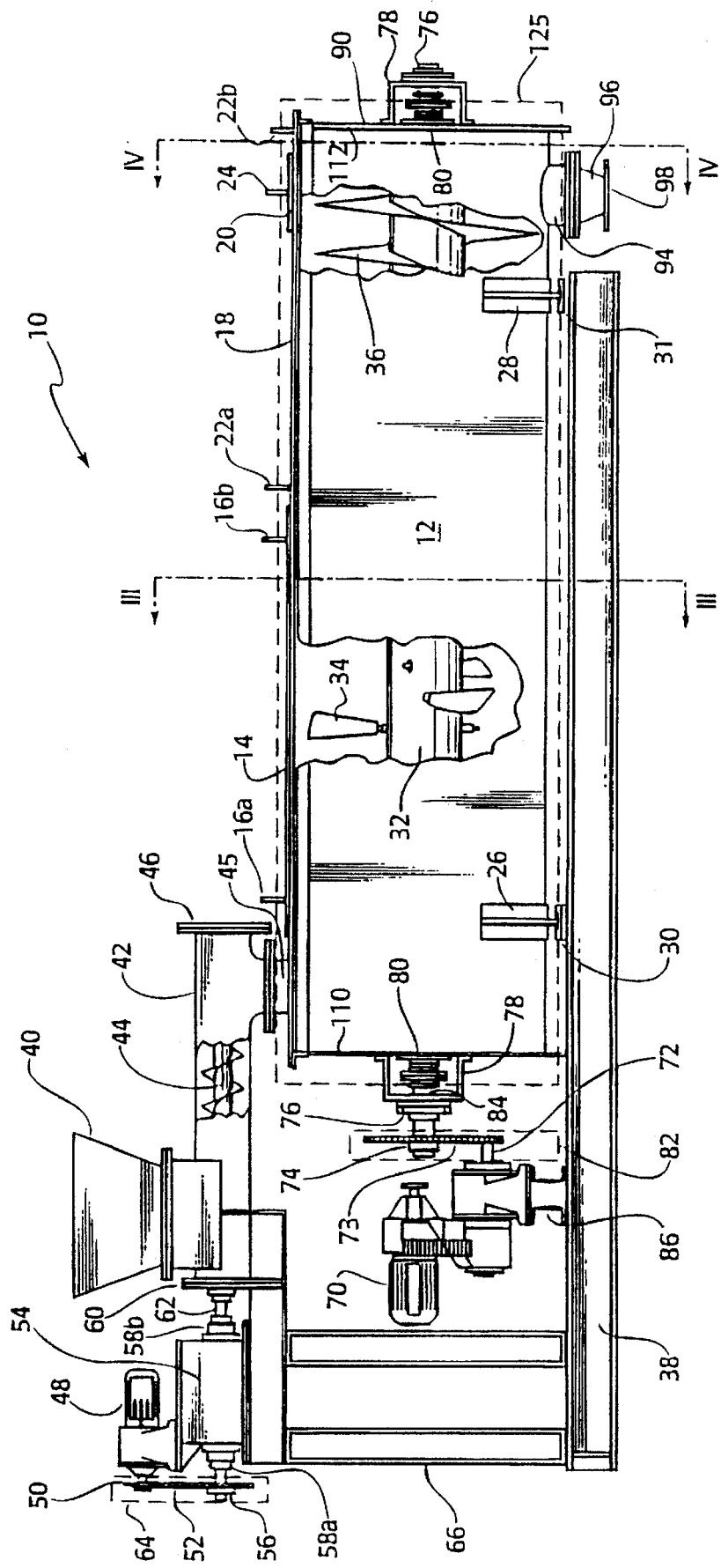
FIG. 2 is a front elevational view partly in cross-section, of an embodiment of the cooling chamber according to the invention.

FIG. 2 shows a front elevation view of the cryogenic air cooling device 10 of the invention. An input hopper 40 receives the material to be cooled and funnels it into sealed feeder pipe housing 42. Input helical screw 44, having a diameter slightly less then that of pipe housing 42, is axially disposed within pipe housing 42 and moves the material along pipe housing 42 until it falls into input 45 of cooling chamber 12. Pipe housing 42 has a removable end plate 46 for maintenance, near the input end 45 of cooling chamber 12. Helical screw 44 has a drive shaft 62 that extends through end plate 60 of pipe housing 42. End plate 60 is disposed at the input end 40 of pipe housing 42. Drive shaft 62 is driven by gear motor 48. Sprocket 50 of gear motor 48 is coupled to a roller chain 52 which is also coupled to sprocket 56 of flange block bearing 58a. A chain guard 64 covers roller chain 52 and sprockets 50 and 56. Flange block bearing 58a is coupled to the first end of bearing and gear motor support 54. The second opposite end of bearing and gear motor support 54 is coupled through flange block bearing 58b to drive shaft 62 of helical screw 44. Helical screw 44 and seal pipe housing 42 are preferably constructed of stainless steel or other well known metal capable of withstanding the frigid temperatures within the cooling chamber 12.

The cooling chamber 12 is an elongated chamber, having a circulating shaft 32 coaxially disposed therein. Circulating shaft 32 is coupled to a drive shaft 84 extending through input end 110 of cooling chamber 12. Circulating shaft 32 is driven by gear motor 70. Gear motor 70 drives a sprocket 72, which is connected to a sprocket 74 through a roller chain 73, so as to rotate drive shaft 84 of circulating shaft 32. Drive shaft 84 has a shaft rider seal 80 and a flange block bearing 76 disposed on the outside of cooling chamber 12 and supported by a bearing support 78. A chain guard 82 protects roller chain 73 and sprockets 72 and 74.

Cooling chamber 12 includes top cover plates 14 and 18 which are gasketed and bolted down during operation. Cover plates 14 and 18 allow access to the interior of cooling chamber 12. Cover plate 18 also has an inspection port 20 disposed above the output 94 of cooling chamber 12 for inspecting the output flow of material within cooling chamber 12. Cooling chamber 12 is entirely surrounded by insulation 125. Insulation 125 is 4 inches thick and has an insulation rating between R-20 and R-30.

Circulating shaft 32 is divided into two sections. The first section has a plurality of adjustable paddles 34, radially extending from the shaft to the inner walls of the chamber. Adjustable paddles 34 circulate the contained material within cooling chamber 12. The first section of adjustable paddles 34 extend from input end 110 of cooling chamber 12 to at least half the length of circulating shaft 32. The pitch of the paddles 34 can be adjusted to regulate the flow of rubber chips through the cooling chamber. The remaining portion of circulating shaft 32, extending from the end of said paddle section (first section) to the output end 112 of cooling chamber 12, comprises the second section. The second section of circulating shaft 32 is designed as a helical screw 36. In the preferred embodiment, the screw is at least 20 inches in length along circulating shaft 32. Helical screw 36 mounted on circulating shaft 32 is disposed above the output opening 94 and forces the material within cooling chamber 12 out the output opening 94 using gravity. Chamber supports 26 and 28 secure the cooling chamber 12 on a flat surface. Metal sheet pads 30 and 31, disposed beneath chamber supports 26 and 28, respectively, cushion said supports from the flat surface on which cooling chamber 12 is mounted.

Figure 3:
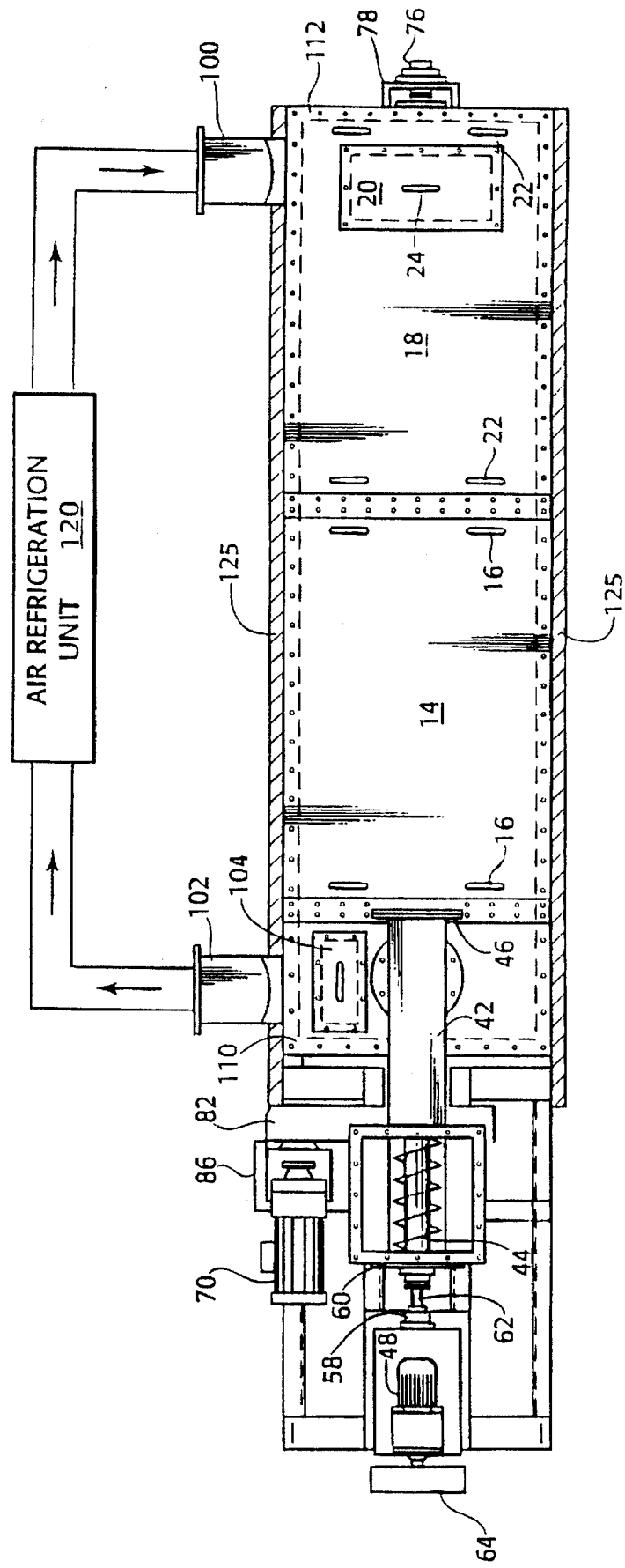
FIG. 3 is a top view of the cooling chamber of FIG. 2.
Figure 4:
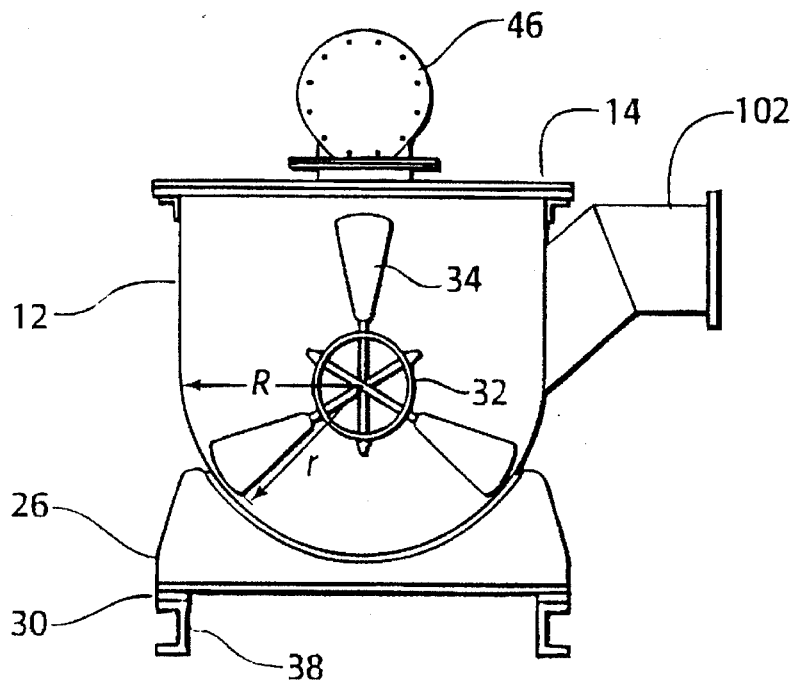
FIG. 4 is a cross-sectional view of the cooling chamber of FIG. 2 taken along line IV—IV.
Figure 5:
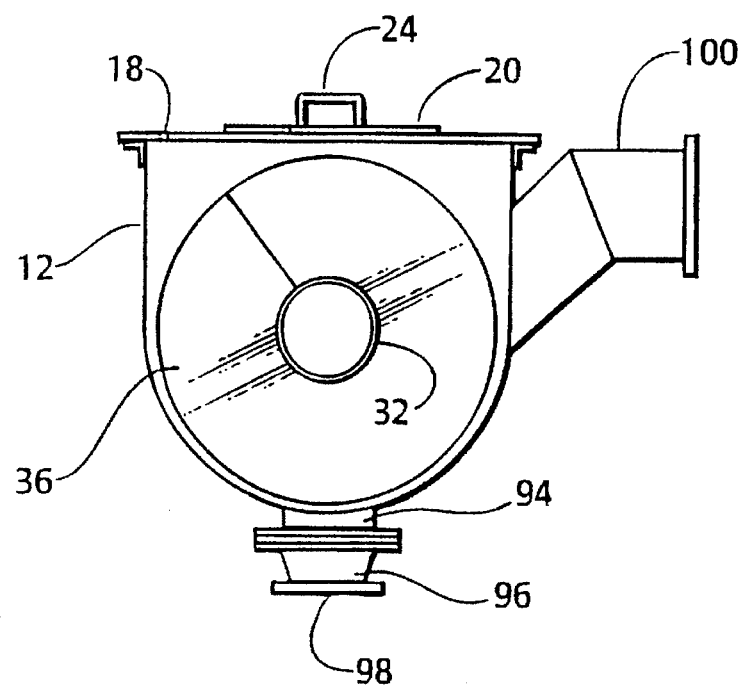
FIG. 5 is a cross-sectional view of the cooling chamber of FIG. 2 taken along line V—V.

Referring to FIG. 3, a top view of the cryogenic air cooling device 10 of the invention is shown. Cold air input 100 feeds cold air from a refrigeration unit 120, having cryogenic temperatures of 0° C. or less, at the material output end 112 of cooling chamber 12. A cold air return 102, disposed at input end 110 of cooling chamber 12, collects the cold air, after it has circulated through cooling chamber 12. The cold air flow, within chamber 12, is countercurrent to the flow of material within chamber 12. As can be seen more clearly, cover plates 14 and 18 completely cover cooling chamber 12. Inspection port 20 allows an inspection of the continuous discharge output of cooling device 10. A second inspection port 104 allows inspection of the continuous flow of material at the input end 110 of cooling chamber 12. Cover plates 14 and 18 are gasketed and bolted down during operation of cryogenic air cooling device 10.

The pieces of tire or other polymeric material are reduced to the desired cryogenic temperature in approximately 15 to 20 minutes, and are then pulverized in step 3 to a powder-like material.

In step 4 of the process, the pulverized material is screened. The screening material has openings or a screen size between 1040 microns and 86 microns. This screening step removes any large pieces of fiber, steel or rubber left after the separation processes.

After the pulverized material is separated and screened, the resulting fine powder can be re-vulcanized into rubber products or used for any other suitable application, such as, for example, use in preparation of asphalt.

In a preferred embodiment of the invention, the cooling chamber 10 receives 4000 cubic meters per hour of chilled air between −90° to −130 ° C. The refrigeration unit 120 used to produce the chilled air used approximately 90 kilowatts per hour and thus can chill each tire to brittle temperatures for about $.12 per tire. Each tire weighs about 20 lbs. and contains approximately 5 lbs. of steel and 1 lb. of fiber. The adjustable chamber paddles 34 are driven by a five horse power electric motor and approximately ⅓ of a horse power is needed for the screw device. With a chamber approximately 40' in diameter and approximately 15' long it is possible to pulverize 175 tires per hour or approximately 3500 lbs. of material per hour.

Figure 6:
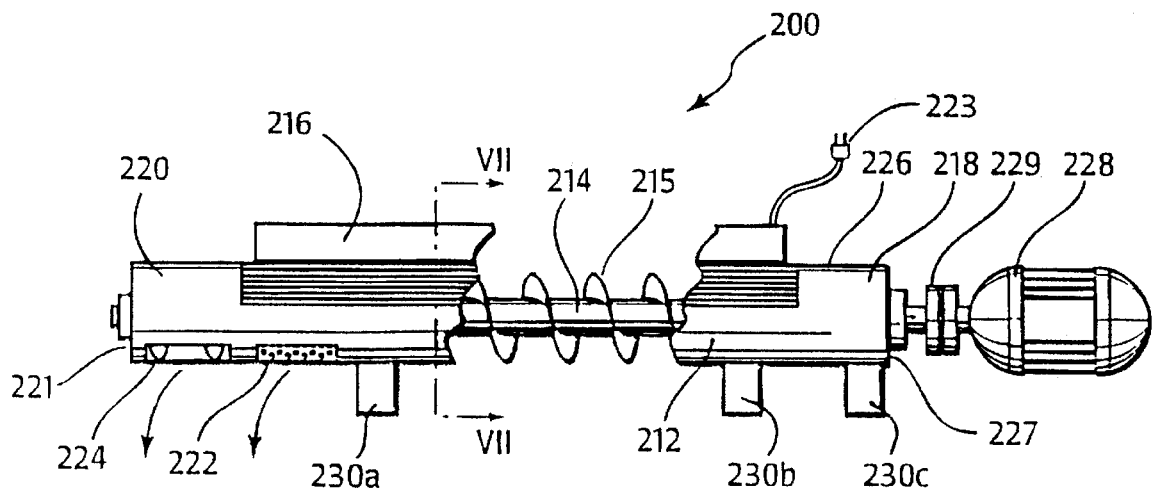
FIG. 6 is a side view, in partial cross-section, of the magnetic separator of the invention.

FIG. 6 shows a first embodiment of a magnetic separator 200 according to the invention. Magnetic separator 200 has an elongated cylinder 212 with helical screw 214 disposed longitudinally therein. Cylinder 212 has an input end 218 with an input opening 226 for receiving the material to be separated and a first flange 227 enclosing said cylinder. Input opening 226 is disposed on the top of cylinder 212 at input end 218 and is simply an opening in cylinder 212.

A distal output end 220 is spaced from input end 218 on cylinder 212. Output end 220 has a second flange 221 enclosing cylinder 212, a first output opening 222 and a second output opening 224 disposed on the bottom of cylinder 212 such that gravity aids in discharging the separated material from cylinder 212. First opening 222 is for discharging the non-magnetic material from cylinder 212 after separation has been performed. First opening 222 can have a screen 223 for preventing large particles from passing therethrough. The screen 223 can be a screen of any suitable known type and size according to the material being separated. Second output opening 224 is disposed adjacent second flange 221 and between said end plate and first output opening 222. Second output opening 224 is for discharging the magnetic material separated from the non-magnetic material.

A magnet 216 is disposed along the top of cylinder 212 and extends from input opening 226 to output end 220. In the preferred embodiment of the invention, magnet 216 extends along the top of cylinder 221 from input opening 226 to a point at output end 220 after first output opening 222 and before second output opening 224. Thus, when material is carried through separator 200 by helical screw 214, magnet 216 attracts the magnetic particles toward the top of cylinder 212 and allows the non-magnetic material to be discharged through first output opening 222. After the non-magnetic material has been discharged through first output opening 222, magnet 216 ends, and the separated magnetic material is no longer attracted to the top of cylinder 212 and is subsequently carried by screw 214 to the second output opening 224 where it is discharged.

The cylinder 212 and helical screw 214 are made of any suitable known metal having magnetic properties when exposed to magnetic fields, and that does not retain those magnetic properties when the magnetic field is removed. An example of such a material may be aluminum, Alnico alloys, and steel. Helical screw 214 has threads 215 which receive and carry the material to be separated through elongated cylinder 212. Helical screw 214 with threads 215, has a diameter slightly smaller than the diameter of cylinder 212 such that screw 214 can rotate freely within cylinder 212.

In the preferred embodiment of the invention, cylinder 212 has a longitudinal axis that is maintained in a substantially horizontal position during operation. However, the magnetic separator 200 can be operated at various angles apart from the standard horizontal position. For example, in a second embodiment, output end 220 may raised to a substantially vertical position such that the input end 218 is lower than output end 220. In this configuration, the separator 200 would push the material against the force of gravity while separating the magnetic material therefrom.

In another embodiment, the input end 218 could be raised above the horizontal position such that cylinder 212 is at an angle with the ground, up to a potential vertical 90 degrees position. In this position, the forces of gravity will aid helical screw 214 in carrying the material downward through cylinder 212.

Leg supports 230a, 230b and 230c are used to support the magnetic separator during use. Any other suitable known type of support device will suffice for providing the needed support during operation.

Motor 228 is connected to helical screw 214 through input end plate 227 of cylinder 212 by bearing connection 229. Motor 228 is a variable speed motor and adjustably rotates helical screw 214 according to the desired speed. Motor 228 is variable in a range of 3–20 revolutions per minute. Any other suitable known type of variable speed motor can be employed to rotate helical screw 214.

Figure 7:
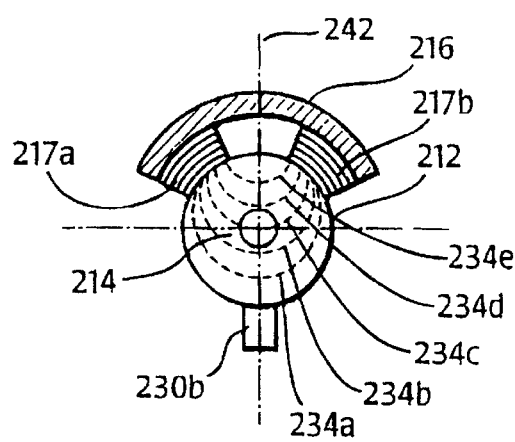
FIG. 7 is a cross-sectional view of the magnetic separator taken along line VII—VII of FIG. 6.

FIG. 7 shows a cross-section of cylinder 212 with a diametrical horizontal axis line 240 and a diametrical vertical axis line 242. The magnet 216 is symmetrically disposed on the top of cylinder 212 about diametrical vertical axis line 242. Magnet 216 is comprised of two elongated magnet portions 217a and 217b which extend along the outer surface of cylinder 212. The magnetic field lines 234a–234e show the attraction of the magnetic particles within cylinder 212 toward the top thereof. The magnet 216 is preferably an electromagnet, however, any magnet of suitable known type will function the same. A power line 223 (FIG. 6) shows the configuration with an electromagnet disposed on cylinder 212.

Figure 8:
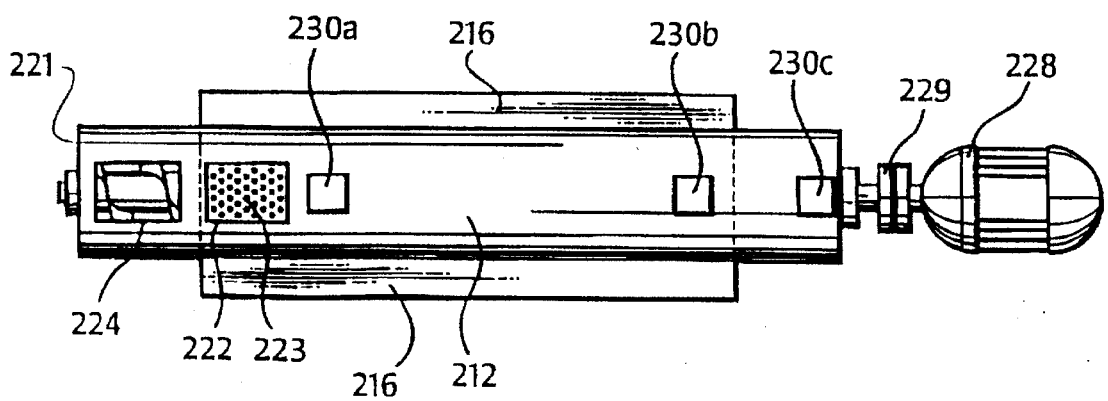
FIG. 8 is a bottom view of the magnetic separator according to the invention.

FIG. 8 shows the bottom of cylinder 212 in the first embodiment with the first output opening 222 disposed under magnet 216 while second output opening 224 is disposed adjacent end 221 and opening 222, but without magnet 216 disposed thereabove. Thus, when the material to be separated is fed into the separator at the input end, helical screw 214 carries and rotates the material within the separator. During the rotation and movement of the material, the magnetic material is attracted by the internal magnetic field created by the external magnet and is thereby drawn to the top of the of the separator cylinder. When the material has been carried and rotated to the output end 220, the non-magnetic material is discharged through first output opening 222. After the non-magnetic material is discharged through opening 222, the remaining magnetic material is carried to the second output opening 224 where it is discharged from the separator. Since magnet 216 ends at a point between the first output opening 222 and the second output opening 224, when the magnetic material is carried beyond opening 222, it is no longer attracted by magnet 216 and is thereby discharged through output opening 224 by helical screw 214 and the forces of gravity. In another embodiment of the invention (not shown), magnet 216 can extend over output opening 224. This will cause screw 214 to force the separated magnetic material from the cylinder 212 without the aid of gravity.

Figure 9:
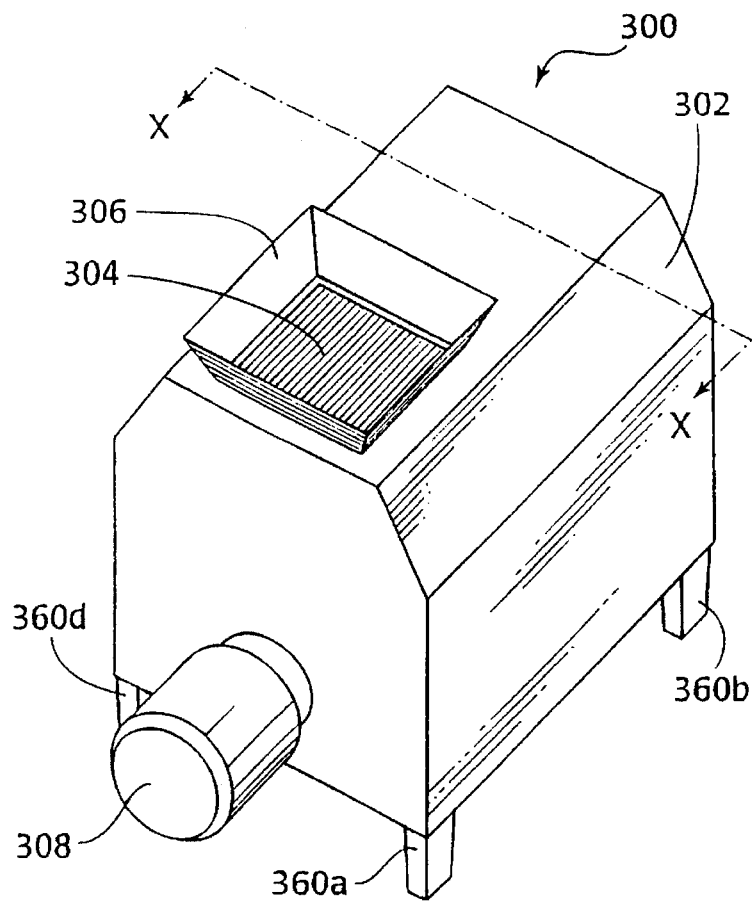
FIG. 9 is a top view of a second embodiment of the magnetic separator according to the invention.
Figure 10:
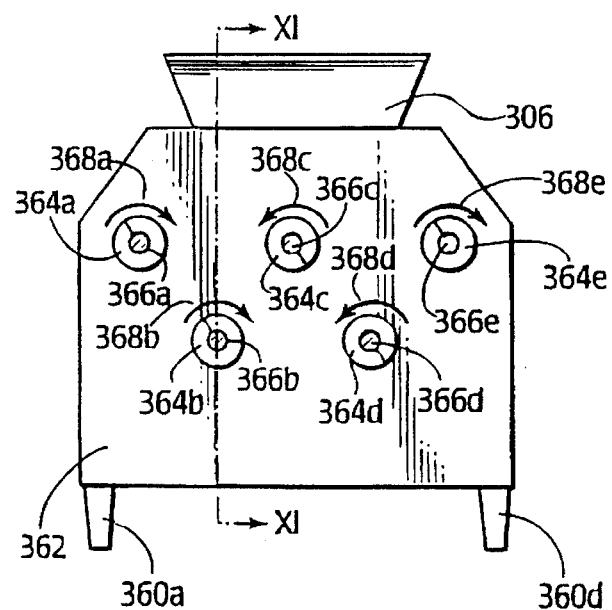
FIG. 10 is a cross section of the magnetic separator of FIG. 9 taken along line X—X.

FIGS. 9–12 show a second embodiment of the magnetic separation apparatus according to the invention. FIG. 9 shows the magnetic separator 300 having a housing 302 with an input opening 304 disposed on the top of said housing. Legs 360a–d elevate and support housing 302. Legs 360a–d can be adjustable or fixed in height. In another embodiment, (FIGS. 13–14), housing 302 can be suspended from the ground by any suitable know type of suspension means. An input shield 306 is provided around input opening 304 to aid in the input of material to be separated into magnetic separator 300. Input shield 306 is angled so as to increase the receiving area of input opening 304. A variable speed motor 308 is connected to one end of housing 302 and provides the required rotational movement of helical conveyors 364a–e (FIG. 10).

FIG. 10 shows a cross-section of the magnetic separator 300 taken along line X—X of FIG. 9. A plurality of helical conveyors 364a–e are mounted within housing 302 in spaced relation with respect to each other and substantially parallel to each other. Each helical conveyor 364a–364e has a corresponding fixed shaft portion 366a–366e and 370a–370e, respectively, and a specific rotational direction 368a–368e. The rotational direction of each helical conveyor 364a–364e is such that each of said conveyors rotates in a direction opposite with respect to the next adjacent conveyor.

Figure 11:
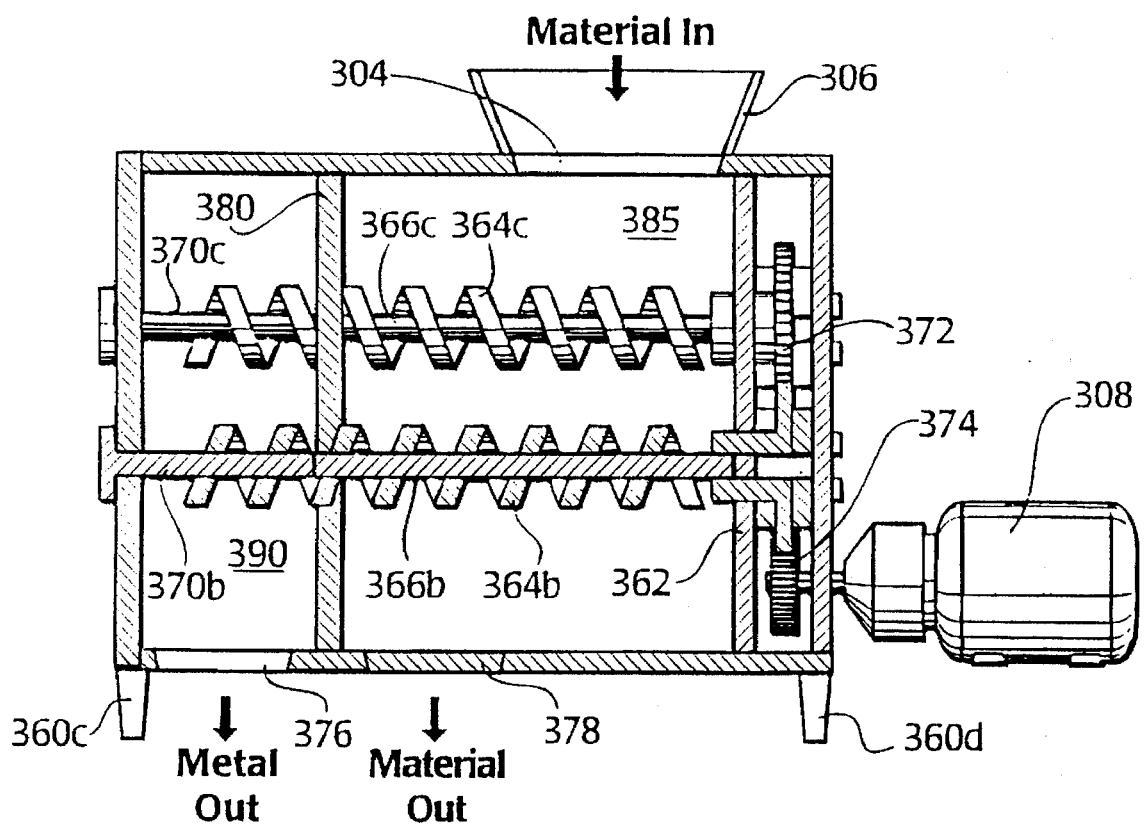
FIG. 11 is a cross section of the magnetic separator FIG. 9 taken along line XI—XI.

FIG. 11 shows a cross-section of the magnetic separator taken along line XI—XI of FIG. 10. Housing 302 is internally separated into two compartments 385 and 390 separated by a partition wall 380. The first compartment 385 receives the material to be separated through input opening 304 where it is then carried by helical conveyors 364a–364e into the second compartment 390. The shaft portion of helical conveyors 364a–e have a first section 366a–e and a second section 370a–e. (366c, 370c, 366b and 370b shown) The first section 366c is contained within first compartment 385 and the second section 370c is contained within second compartment 390.

The first shaft sections 366a–e consist of an exposed magnet, while the second shaft sections 370a–e consist of any other non-magnetic material, such as, for example, stainless steel. The first shaft sections can be any natural magnetic substance, or can be an electro-magnet. Shaft portions 366a–e and 370a–e are stationary during operation.

Thus, helical conveyors 364a–e are rotated, through a gearing mechanism 372, around both of the magnetic and non-magnetic shaft portions to carry the material to be separated through the magnetic separator. Motor 308 is connected to gearing system 372 through gear 374. The gearing mechanism 372 is enclosed in housing 302 and separated from compartment 385 by a partition wall 362.

Figure 12:
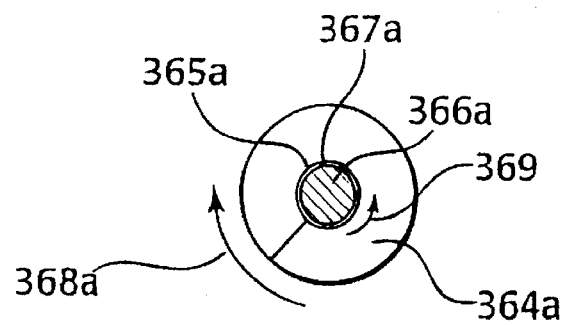
FIG. 12 is a cross section of a helical conveyor according to the second embodiment of the magnetic separator according to the invention.

FIG. 12 shows an enlarged view of helical conveyor 364a. As shown, helical conveyor 364a rotates in a direction 368a around shaft 366a. Shaft 366a is an exposed magnet of any suitable known type. Helical conveyor 364a has an inside surface 365a that is situated adjacent the exterior surface 367a of shaft 366a, such that the rotation of helical conveyor 364a enables said conveyor to move material along shaft 366a without interfering with the attraction of magnetic particles to shaft 366a. In another embodiment of the invention, the magnetic shaft 366a can be rotated in a direction 369 opposite to the rotational direction 368a of helical conveyor 364a or in the alternative, in the same direction 368a as said conveyor. When magnetic shaft 366a is rotated in the same direction 368a as helical conveyor 364a, it is preferable to rotate said magnetic shaft at variable different speeds with respect to said conveyor. Thus, when material to be separated is input through input opening 304, the material is placed in direct contact with a plurality of helical conveyors 364a–e and the magnetic shafts 366a–e associated therewith. As helical conveyors 364a–e are rotated in their respective directions 368a–e, the magnetic material is attracted to the exposed magnetic shafts 366a–366e and the non-magnetic material is discharged through a first output opening 378. This discharge of non-magnetic material is aided by gravity.

As the non-magnetic material is discharged through output opening 378, the magnetic material continues to be carried along the magnetic shafts 366a–e into the second compartment 390 of separator 350. Once the magnetic material passes along shafts 366a–e beyond partition wall 380, and into compartment 390, said shafts become non-magnetic (370a–e) and the magnetic material is released from said shafts and discharged from a second output opening 376.

FIG. 13 shows a third embodiment of the magnetic separator 300 disposed in-line with the material input receiver 307 and material output duct 377. The housing 302 of separator 300 is suspended within a conveyor system such that un-separated material is fed into input receiver 307, separated within said housing, and the non-magnetic material is discharged through output duct 377 for further processing. The magnetic material is then discharged through output opening 376 (FIG. 14).

FIG. 14 shows a cross-sectional view of the embodiment of FIG. 13 taken along line IX—IX. Housing 302 has an input opening 305 in the top thereof and completely enclosed by input receiver 307. Output opening 379 is disposed in the bottom of the magnetic separator housing, and in also completely enclosed by output duct 377. The operation of magnetic separator 300 is the same as described for FIGS. 9–12.

Figure 15:
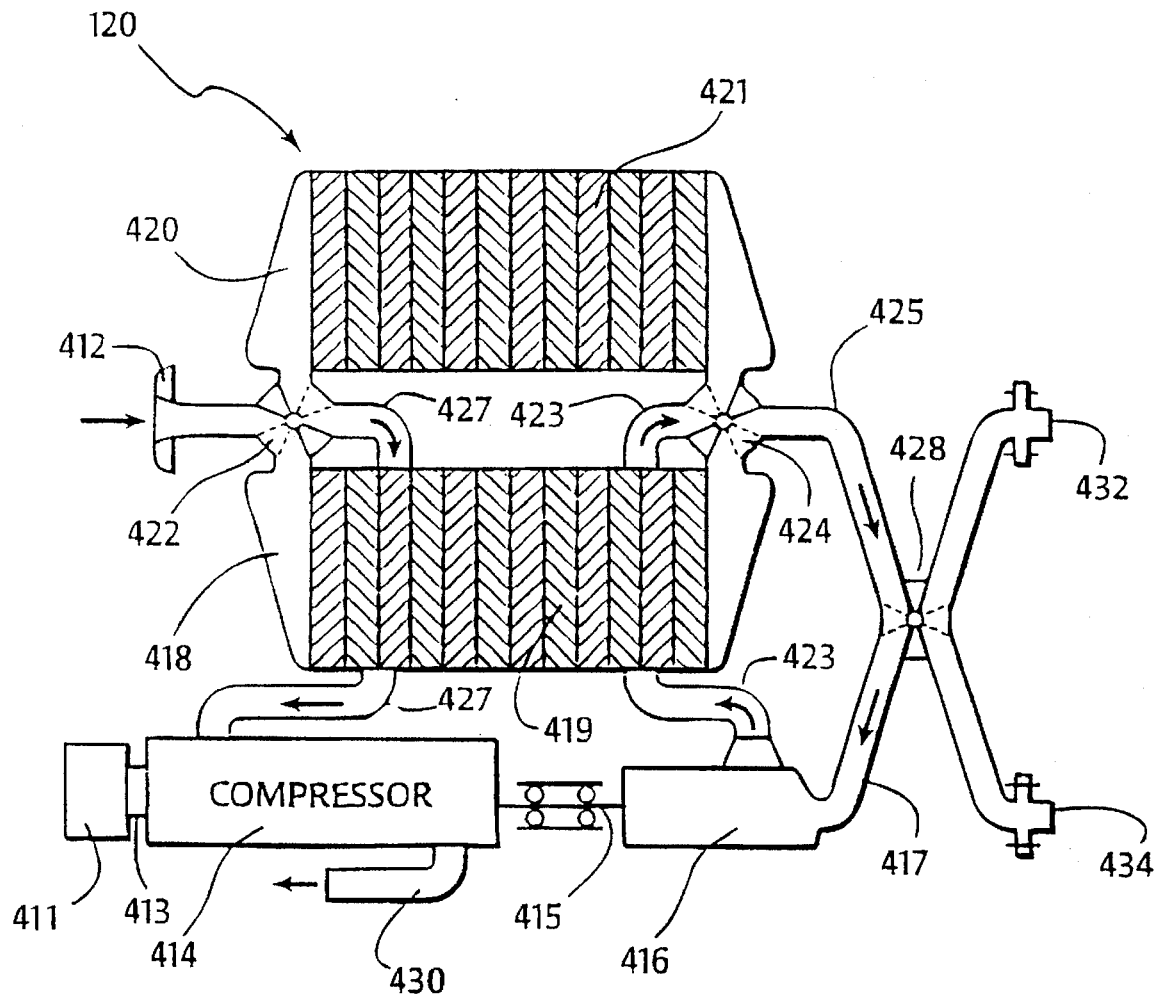
FIG. 15 is a schematic diagram of the ambient air freezing system upon initial activation according to the invention.

FIG. 15 shows the ambient air freezing/refrigeration system 120 in its initial activation stage. Upon the initial activation of the system, valves 422 and 424 are in their first initial position, as shown. By closing valve 428, and eliminating cooling chamber 12 (FIG. 3), the chilled air output 425 is directly connected with input 417 to expander 416. This enables the system to reach the desired cryogenic temperatures much faster than if the cooling chamber were connected.

The first cycle of the system will reduce the received ambient air by approximately 30° C. Subsequent cycles will further reduce the air temperature in substantially 30° increments until the losses in the system balance out and an equilibrium temperature of substantially −120° C. is reached. When the system approaches the desired −120° C. temperature, each subsequent cycle will not reduce the temperature 30 degrees. Thus, air refrigeration system 120 is capable of reducing the ambient air to cryogenic temperatures below −120° C., such as, for example, −180° C. without the use of cryogenic chemicals or refrigerants.

The ambient air freezing/refrigeration system 120 consists of an electric motor 411, of any suitable known type, connected to a compressor 414 through a gearbox 413, a turbo expander 416 mounted on the same shaft 415 as compressor 414, a first regenerator 418, a second regenerator 420, a fan 412, valves 422, 424 and 428, and a cooling chamber 12 (FIG. 3).

Fan 412 blows ambient air from outside the system through the packing 419 of first regenerator 418. The air is then pumped from regenerator 418 out the chilled air output 425 and directly into expander 416. Expander 416 expands the air to 0.5 atmosphere, thereby reducing the temperature of the air approximately 30° C. The cooled air is circulated into regenerator 420 via valve 424. The cooled air cools packing 421 and is then fed into compressor 414 where the air is compressed back to 1 atmosphere and then exhausted from the system via exhaust outlet 430. While the cooled air passes through regenerator 420, it simultaneously cools the packing 421 and sublimates all moisture left in the regenerator from the previous cycle. Input 427 and output 423 of compressor 414 and expander 416, respectively, do not pass through regenerator 418, but pass around said regenerator.

Figure 16:
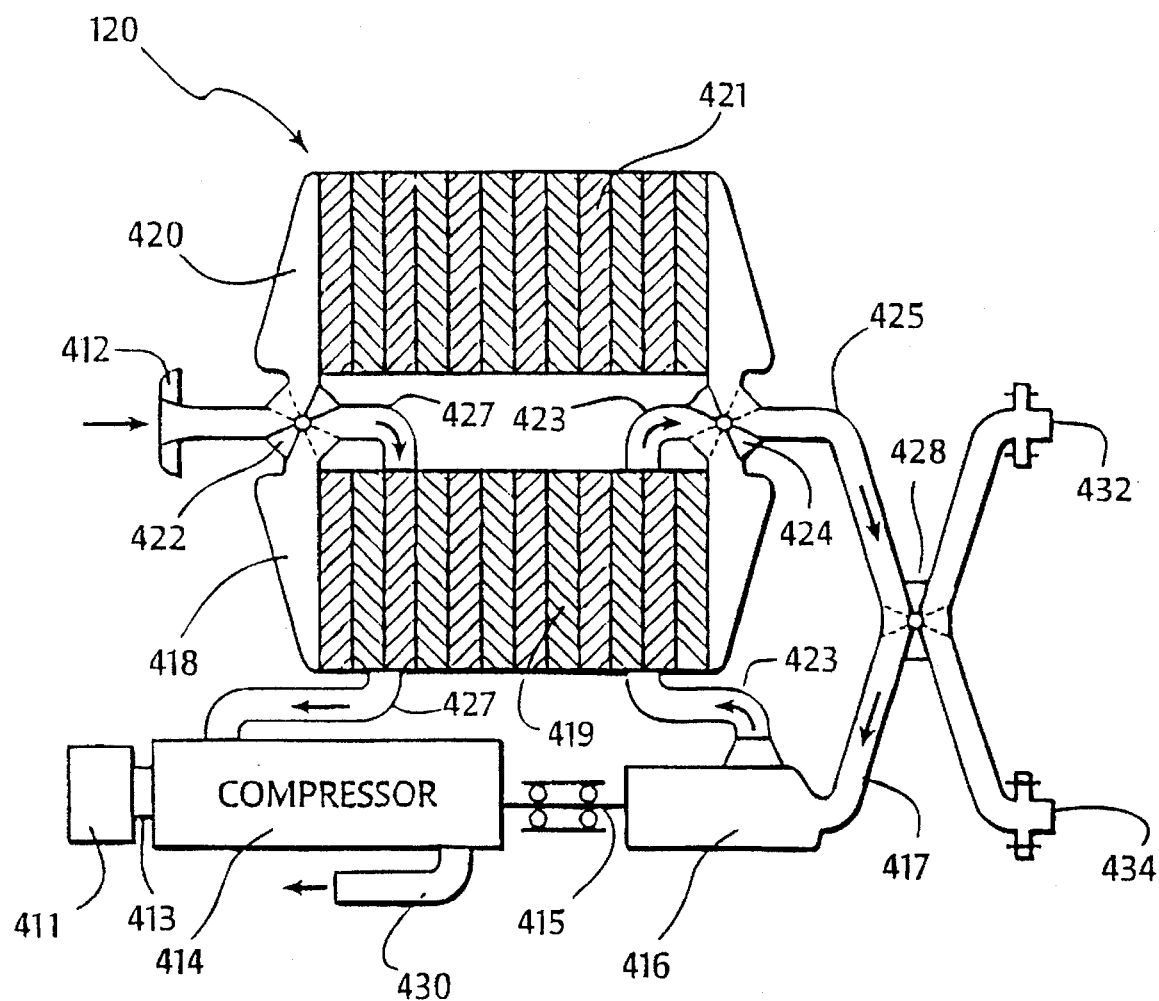
FIG. 16 is a schematic diagram of the ambient air freezing system according to the invention after initial activation thereof.

FIG. 16 shows the second cycle of the ambient air freezing/refrigeration system 120 after initial activation. After the initially cooled air is circulated from regenerator 420 into compressor 414, valves 422 and 424 simultaneously switch positions, as shown. Now fan 412 blows ambient air into the cooled regenerator 420 where the air is cooled. The air is then circulated from regenerator 420 through output 425, via valve 424, and into expander 416 where the air is expanded to 0.5 atmosphere. The expanded, and thereby cooled air is then pumped into regenerator 418, via valve 424. The packing 419 of regenerator 418 is then cooled by the incoming air. Once the air has circulated through regenerator 418, it is fed into compressor 414, via valve 422, where it is compressed back to 1 atmosphere and exhausted from the system. The cycle as described in FIGS. 15 and 16 must be repeated several times in order to have packings 419 and 421 of first and second regenerators 418 and 420, respectively, be preliminarily cooled to the desired −120° C. Regenerators 418 and 420 can also be replaced by heat exchangers.

Figure 17:
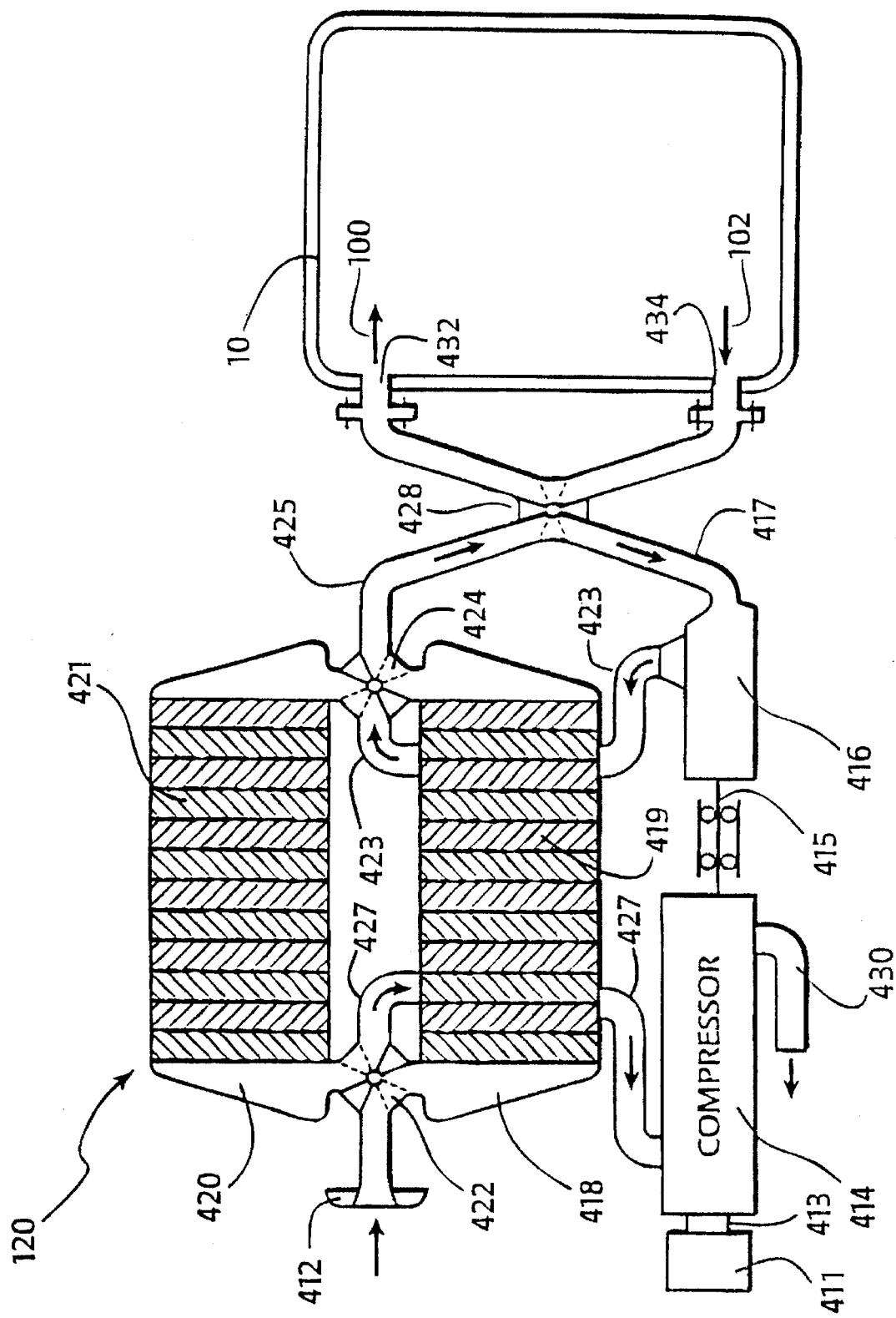
FIG. 17 is a schematic diagram of the ambient air freezing system during operation according to the invention.

FIG. 17 shows the ambient air freezing/refrigeration system 120 with the cooling chamber 12 connected thereto. Once the system has been initially charged, packing 419 and 421 of regenerator 418 and 420, respectively, have been cooled to the desired −120° C. temperature. Fan 412 then blows ambient air from outside the system through the preliminarily cooled first regenerator 418. The cold air is then pumped via valve 428 into cooling chamber 12 through output 432 and in input 100 of said chamber. At the air refrigeration return 434 of system 120 and return 102 of chamber 12, the temperature of the air has increased (warmed) to approximately −80° C. as a result of the heat from the object(s) being cooled. The return air is then fed into turbo expander 416 where it is expanded from 1 atmosphere to 0.5 atmosphere (Kgf/cm); doing the mechanical work and reducing the temperature of the air back to −120° C. The −120° C. air is then fed into second regenerator 420 via valve 424. The packing 421 of second regenerator 420 is then chilled by the −120° C. air flowing therethrough. After packing 421 is chilled, the air then passes through valve 422 and returns to compressor 414 where it is compressed to atmospheric pressure (i.e., 1 atmosphere). The pressure increase in the air raises its temperature to approximately +100° C. at which time it is exhausted from the system through exhaust output 430.

Valves 422 and 424 operate simultaneously and thereby cause first and second regenerators 418 and 420, respectively, to alternately receive the cold air generated by the expander and ambient air from outside. While the packing 419 of first regenerator 418 is being cooled by the expanded air from expander 16, the second regenerator 420 is receiving a flow of air from outside the system having the ambient temperature and vice versa. Thus, once the ambient air has passed through second regenerator 420 and fed into cooling chamber 12, valves 422 and 424 switch position to now feed the outside ambient air to first regenerator 418 and the expanded air from expander 416 to second regenerator 420.

Compressor 414 can be any compressor of suitable known type. Multiple stage compressors have proven to work more efficiently with the system. Expander 416 can be any expander of suitable known type, such as, for example, an adiabatic expander. Motor 411 provides power to compressor 414 and expander 416 via shaft 415. Motor 411 has a shaft speed of 3,000 rpm and operates at 50–60 Hz with an appropriate supply voltage. The cooling chamber 12 can be replaced with any applicable cooling chamber for the particular products being frozen.

Figure 18:
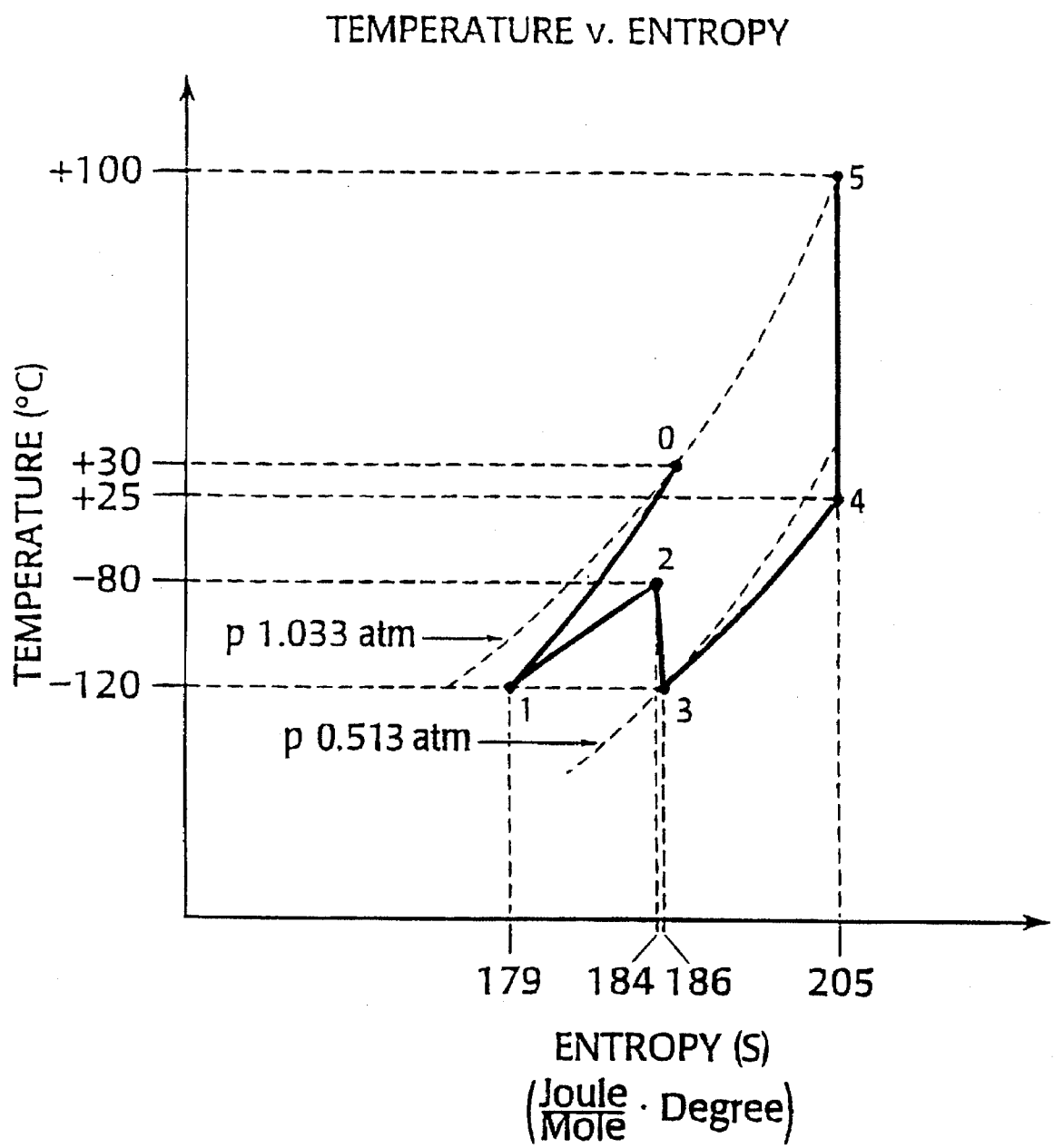
FIG. 18 is a graphical representation of temperature vs. entropy of the air freezing process performed by the ambient air freezing/refrigeration system according to the invention.

FIG. 18 shows a graphical representation of the process of ambient air freezing performed by the ambient air freezing system 410. It is to be understood that the system has been fully charged to its operating equilibrium before starting the process as depicted by FIG. 16. As shown at point 0, ambient air at a temperature of +30° C. is drawn into the system through fan 412. The input of ambient air is then cycled into the first regenerator 418 where the temperature has now been reduced to −120° C. as shown by point 1. The cooled air is then fed into the cooling chamber 12, where the air temperature is warmed to −80° C. by taking heat from the object being cooled, as shown by point 2. The −80° C. air is then fed into turbo expander 416 where the air pressure is expanded to a pressure of 0.5 Kgf/cm 2, as shown by point 3. The expansion of the pressure reduces the air temperature back to −120° C. This cooled air is then fed into the second regenerator 420 where it cools its packing. This is shown by the transition of points 3–4. The air which is now at approximately +25° C. is then fed back into compressor 414 where it is compressed to atmospheric pressure, as shown by points 4–5. This compression increases the air temperature to +100° C. and is subsequently discharged into the surrounding atmosphere.

In a preferred embodiment, the refrigeration capacity of freezing system 400 is 26,000 Kcal/hr, while the power consumed by the system is only 85 KW/hr. However, the refrigeration capability and capacity of freezing system 400 is unlimited with the power consumption rating changing relative to the desired freezing capacity.

While several embodiments of the present invention have been shown and described, it is to be understood that many changes and modifications may be made thereunto without departing from the spirit and scope of the invention as defined in the appended claims.

We claim:

1. A process for recycling tires and other recyclable material, said process comprising the steps of:
   shredding the tires and other recyclable material into small pieces;
   feeding the small pieces into a cooling chamber;
   cooling the pieces within the cooling chamber to cryogenic temperatures in the range of −90° C. to −130° C. with an ambient air freezing-refrigeration system comprising:
     an ambient air inlet and a chilled air output;
     first control means connected to the ambient air inlet for controlling the input flow of air;
     second control means connected to the chilled air output for controlling the output flow of air into an input of the cooling chamber;
     regenerator means coupled to said first and second control means for cooling the input ambient air;
     a compressor having an input connected with said first control means and said regenerator means and an output, said compressor having a central axis shaft;
     an expander having an input coupled with the cooling chamber return and an output coupled with said second control means and said regenerator means, said expander being disposed along the same central axis shaft of said compressor; and
     an electric motor connected with said compressor for providing power to the system;
   said ambient air freezing/refrigeration system cooling said pieces to cryogenic temperatures without the use of cryogenic chemicals/refrigerants, said pieces becoming brittle at said cryogenic temperature;
   pulverizing the cryogenically cooled pieces to obtain a substantially pulverized material;
   screening the pulverized material to remove non pulverized pieces; and
   separating steel and fiber by-products from the pulverized material, whereby the resulting material is a fine rubber powder.

2. The process according to claim 1, wherein said step of separating further comprises the step of magnetically separating steel particles from the pulverized material using a magnetic separator.

3. The process according to claim 2, wherein said step of separating further comprises the step of vibrationally separating the fiber by-products out of the pulverized material.

4. The process according to claim 1, further comprising the step of maintaining said pieces at said cryogenic temperature for substantially 15 minutes.

* * * * *